CIRCUIT ARRANGEMENT FOR AUTOMATIC TELEPHONE EXCHANGES

Filed Dec. 30, 1959 3 Sheets-Sheet 1

INVENTORS
JOHN CARL HAROLD BJÖRK
BENGT ERIK BACKHOLM
By Hane and Nydick
ATTORNEYS

CIRCUIT ARRANGEMENT FOR AUTOMATIC TELEPHONE EXCHANGES

INVENTORS
JOHN CARL HAROLD BJÖRK
BENGT ERIK BACKHOLM

BY Hane and Nydick
ATTORNEYS

CIRCUIT ARRANGEMENT FOR AUTOMATIC TELEPHONE EXCHANGES

Filed Dec. 30, 1959 3 Sheets-Sheet 3

INVENTORS
JOHN CARL HAROLD BJÖRK
BENGT ERIK BACKHOLM
BY Hane and Nydick
ATTORNEYS United States Patent Office 3,184,553
Patented May 18, 1965

3,184,553

CIRCUIT ARRANGEMENT FOR AUTOMATIC TELEPHONE EXCHANGES

John Carl Harold Björk, Hagersten, and Bengt Erik Backholm, Bandhagen, Sweden, assignors to Telefonaktiebolaget L M Ericsson, Stockholm, Sweden, a corporation of Sweden Filed Dec. 30, 1959, Ser. No. 862,963
Claims priority, application Sweden, Jan. 12, 1959, 256/59
7 Claims. (Cl. 179—27)

Figure 1:
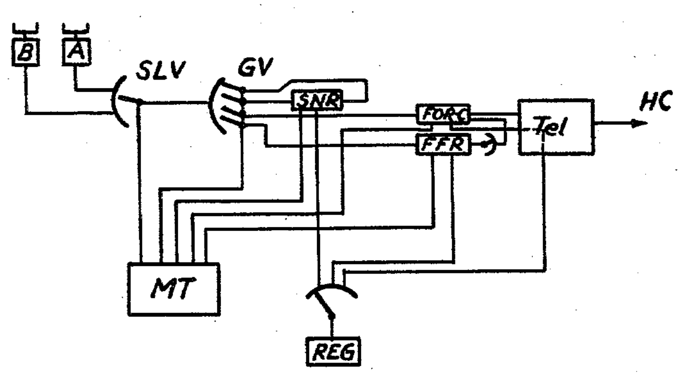

The present invention refers to a circuit arrangement for testing by means of a single test wire whether a called line is free or occupied and for holding the bridges (verticals) of cross bar switches in the line terminal multiple of a private exchange working with cross bar switch links.

An exchange of said type usually comprises a marker which connects two arbitrary internal lines with each other by means of an identifier, through a link circuit and free selectors (bridges) by means of the numerical signals stored in a register, or on the other hand it connects an incoming line which has been connected to the operator, to an arbitrary internal line through an exchange line. The line equipment for each line includes a cut-off relay which through a test wire passing through the selectors, is kept energized from the link circuit or the exchange line while a conversation is going on.

Theoretically it would be possible to use only three wires passing through the selectors, that is the two speech wires and one test wire for the testing operation as well as for holding the bridge in the line terminal multiple in order to make more use of the multiple of a selector and to obtain a greater number of links when having a definite number of selectors. In this case it would however be impossible in a usual connection to satisfy the usual demands upon a private exchange, namely supervision of the conversation so that a waiting subscriber is automatically connected to an occupied subscriber after he has terminated the conversation, furthermore signalling that someone is already connected to automatic waiting, and automatic ringing when a preferential subscriber enters into a proceeding conversation and requests the participants to terminate the conversation. In order to carry out said functions it has hitherto been necessary to use four wires through the links.

According to the invention testing by means of a single test wire is effected in a circuit arrangement for an automatic private telephone exchange including cross bar selectors and subscriber line circuit systems connected to a line terminal multiple through which each subscriber equipment is connectable to alternate selectors by providing at least one operator equipment, connecting relay sets for connecting a subscriber equipment respectively with another subscriber equipment and with said operator equipment, a marker for setting up connections through links including the connecting relay sets and at least two additional selectors in series, test wires belonging to each subscriber equipment and extending through said links for indicating by their potential condition the additional and busy conditions respectively of a subscriber equipment, the selector of said at least two selectors which is located nearest to the called subscriber equipment being held in operative condition through said test wire, and a cut-off relay in each subscriber equipment operated by the busy-indicating potential condition of the test wire for blocking subscriber equipment against new calls. The circuit arrangement according to the invention further provides a first direct connection in each link between the test wire and the busy-indicating potential and a second indirect connection between the test wire and the busy-indicating potential through a resistance, a rectifier in each test wire and a break contact short circuiting the rectifier to allow the busy-indicating direct connection potential through the line terminal multiple to be fed to a link through which the busy subscriber is called, and means for removing the short circuit of the rectifier in the link which has been set up last to release the selector located nearest to the busy subscriber equipment. Finally the circuit arrangement includes a waiting relay holding a calling link in connection with the equipment of a subscriber equipment momentarily occupied as long as it obtains direct connection potential but releases when obtaining only the indirect connection potential.

Figure 2:
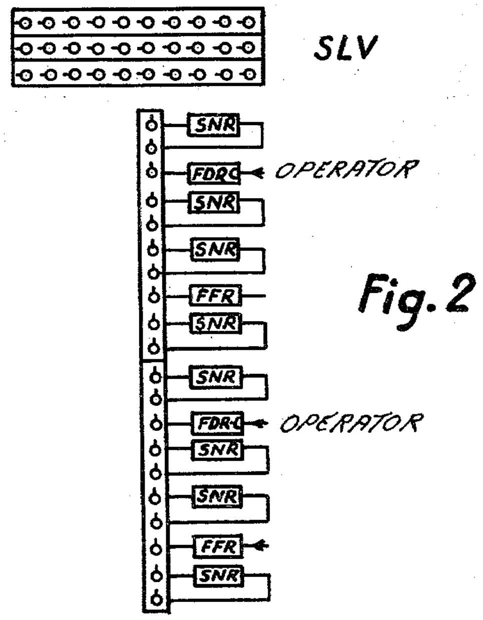
Figure 3:
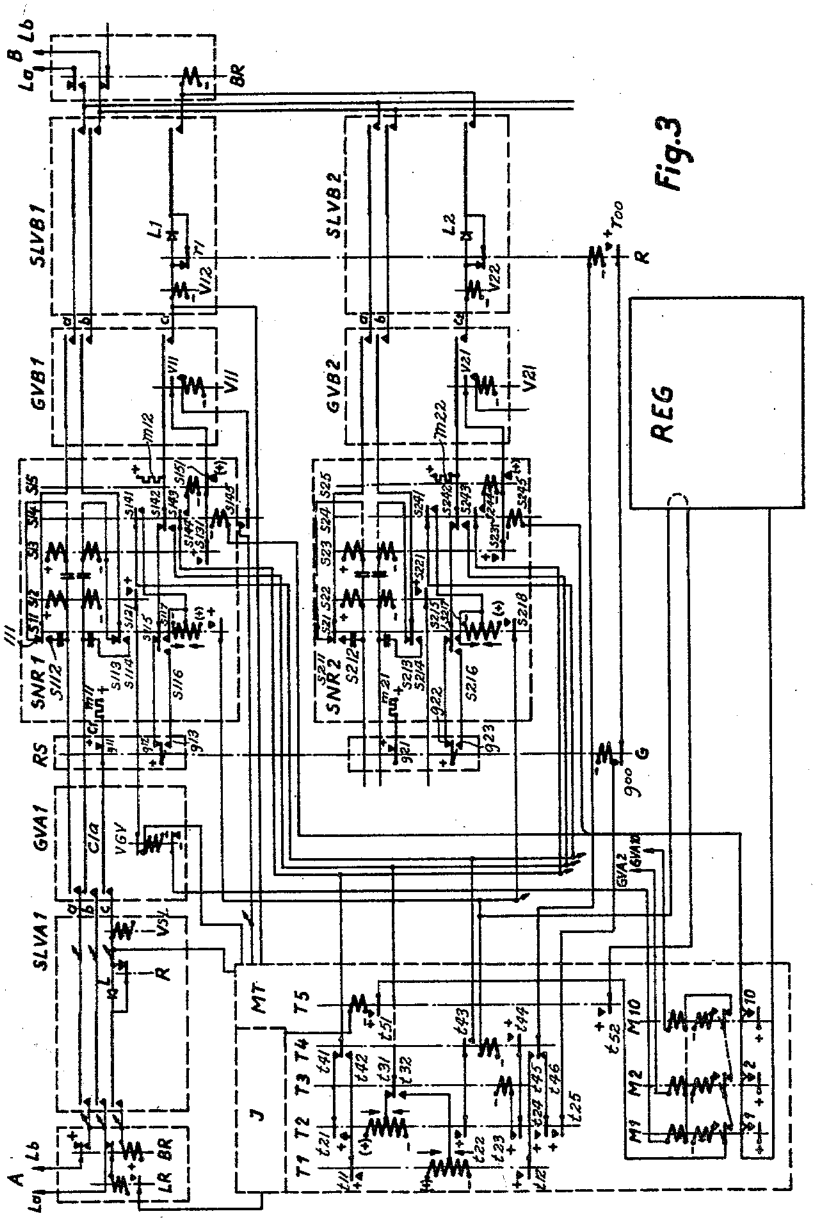
Figure 4:
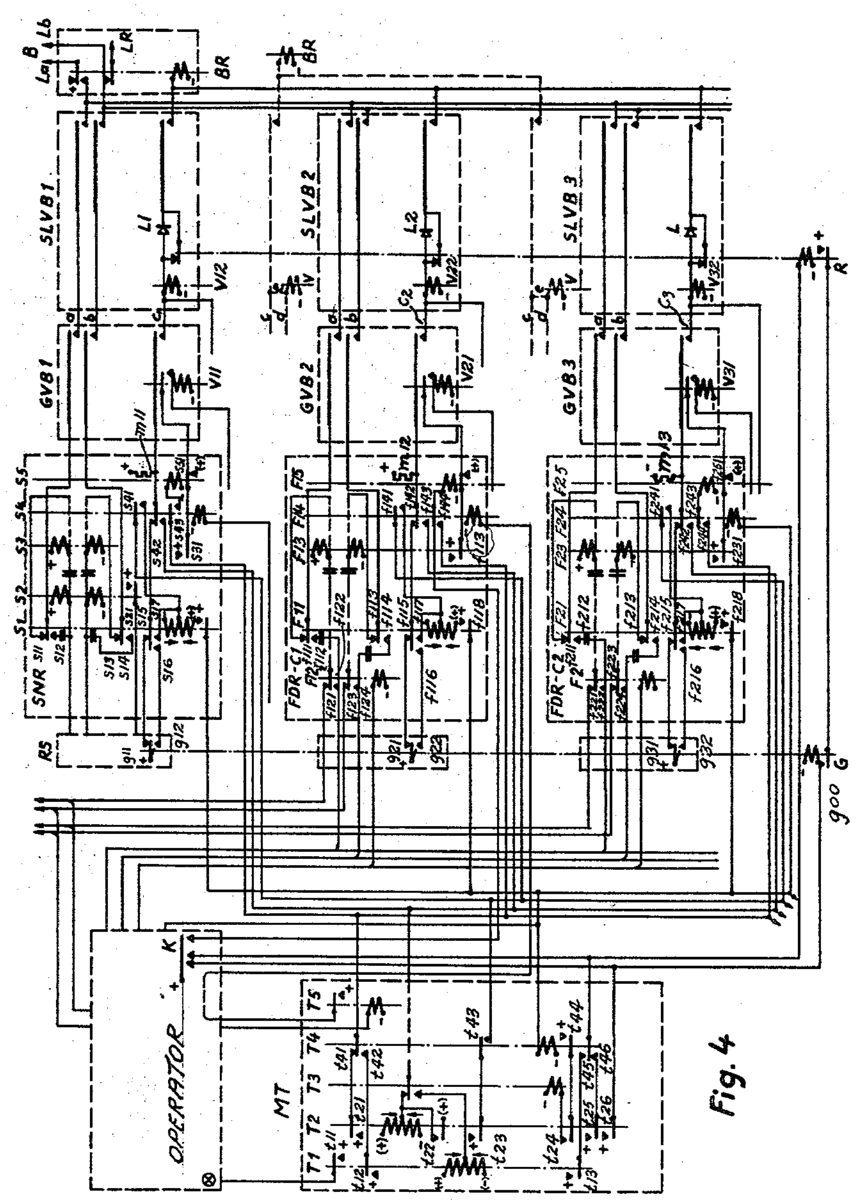

The invention will be described more in detail hereabelow by means of some embodiments with reference to the attached drawing in which FIG. 1 is a trunking diagram for an automatic private exchange having two connecting stages, FIG. 2 shows a grouping diagram for the bridges in the selector stage, FIG. 3 shows a more detailed circuit diagram for a connecting process when connecting a preferent line and FIG. 4 shows a circuit diagram for a connecting process in automatic waiting.

FIG. 1 shows a typical trunking diagram for an automatic private exchange, representative of both, conventional arrangements and an exchange according to the invention. The private exchange includes two selector stages SLV and GV. The line terminals are connected to the multiple of the selectors in the SLV-stage and the multiple of the GV-stage has been connected to the inlets of the bridges in this stage. According to the illustrated embodiment there are 30 bridges in the SLV-stage and the multiple capacity for the GV-selectors is thirty. Thus from each GV-selector a connection will be obtained to all the 30 bridges of the SLV-stage. Link circuits SNR, exchange lines FDR–C and inquiring lines FFR which are connected each to its bridge-inlet in the GV-stage can be connected through the bridges to every bridge in the SLV-stage. A register is arranged for storing digit information in known manner as well for call as for inquiring, furthermore there is provided a marker setting up the connections through free selector stages.

FIG. 2 shows the grouping of the selectors in the two stages. Three SLV-selectors with in all 30 bridges have access to 90 subscriber line terminals. The GV-selectors, the number of which is determined by the number of exchange lines, link circuits and inquiring lines have access to all the 30 bridges in the SLV-stage. In FIG. 2 is diagrammatically indicated how the link circuits, the exchange lines and inquiring lines are connected to the bridge inlets of the GV-stage. The above mentioned is true not only for the invention but it may also refer to a conventional automatic private exchange. It is believed to be clearest to start with a generally used embodiment in order to explain the principle of the invention.

Upon calls coming to the exchange the operator calls the desired subscriber line terminal through an exchange line FDR–C (FIG. 1). If the subscriber is free, the communication is set up via the exchange line through a GV-bridge belonging to the same and through a free SLV-bridge in the subscriber line terminal multiple. The GV-bridge receives holding potential from the exchange line while the SLV-bridge and the cut-off relay (BR), of conventional design, of the subscriber line (not shown) keeping the line equipment of the subscriber line blocked during the conversation, obtain holding potential from the exchange line through the GV-bridge. In the known exchanges it is necessary to hold the SLV-bridge and the cut-off relay of the line through separate wires. Through a test wire (*c*-wire), the potential condition of which indicates the occupied respectively free condition of the subscriber line, the BR-relay is kept energized, while another wire, leading to the bridge magnet (*d*-wire), has the purpose of retaining the bridge during the conversation (FIG. 4, to the right, windings and current paths shown by dotted lines). The difficulty of replacing these two wires by only one wire consists among others therein that the SLV-bridge called by the exchange when connected to an occupied subscriber line, receives holding potential from that connecting means (for example link circuit, exchange line) by which the desired subscriber line is occupied. Thus if the bridge is held over the *c*-wire, it will be blocked during the time the required subscriber line is occupied, even if the calling party does not want to wait, and not before the called party has terminated the conversation will release as well the SLV-bridge used by the connection as the SLV-bridge which has been locked upon busy test. In this way all SLV-bridges which have made a call to the occupied subscriber line would be kept blocked through the revertive current paths until said subscriber has terminated the conversation, if the test wire also is used for holding the SLV-bridge. The present invention in which only one wire is used for both said purposes the problem of distinguishing between holding potential and test potential is solved by means of a balance-circuit. However, it is not only necessary to distinguish between a free and an occupied line terminal through this single wire but also to test whether an earlier set up communication is connected to an automatic waiting circuit, possibly to receive further information about the waiting exchange line (for example if this indicates that the call is coming from a trunk line) and furthermore to carry out other functions used in an automatic drive exchange, for example to allow a preferential subscriber to connect himself to a proceeding conversation. All of the above mentioned problems can be solved with a single wire instead of the two wires which earlier have been necessary if the circuit arrangement according to the present invention is used.

FIG. 3 shows a circuit diagram of an embodiment of the circuit arrangement according to the invention for connecting a preferential subscriber to a subscriber B being in conversation with another subscriber A. When the A-subscriber lifts his handset, he is connected to an identifier I and a marker MT which in known manner connects him over free bridges SLVA1 and GVA1 to a free link circuit SNR1 and a free register REG. The subscriber dials the number and the marker sets up the communication, by means of the digit information stored in the register, to the desired line through free bridges GVB1 and SLVB1. Upon operation of the marker a relay T5 is operated which in turn operates a break out relay row M1–M10 for selecting a free link circuit. From the GVA-bridges belonging to free link circuits the respective M-relays obtain potential so that one of these is operated and in turn operates a relay S14 in the selected link circuit SNR1. The wire C1 of the link circuit is connected to positive polarity through a transfer contact G12 of a relay G controlled by the marker, and to positive polarity through a resistance *m*12. The operation of the relay S14 disconnects the direct or "pure" positive potential from the test wire and connects to the marker the portion of the test wire which obtains positive potential through a resistance *m*12 (not "pure" positive potential) and which through free bridges GVB1 and SLVB1 has been connected to the called subscriber line. If the called line is occupied, e.g. by conversation through link circuit SNR2, its cut-off relay BR is connected through the test wire of said line terminal to pure positive polarity *g*22, *s*215, *s*242, test wire C2, through the bridges GVB2, SLVB 2), so that a balance relay T2 which upon connection of the marker to the transfer contact S145 of the relay S14 has been connected to the *c*-wire, can operate. If the called line is free, the relay T2 will obtain positive potential through a resistance M12 in SNR1 so that it does not operate. In this case the marker is released and a ringing signal is sent in the same manner as in a conventional automatic private exchange. The bridge of the GVB-selector is held with positive potential through the break contact *s*15 of the relay S15 in SNR1 and the SLVB1 bridge is held with the same positive potential as BR through the common test- and holding wire *c*1 with positive potential from the contact *g*12 of the relay G.

The first essential difference between the system of the invention and a conventional automatic private exchange with a common test-and holding wire becomes evident when if the desired line is occupied. In this case the relay T2 is operated as is mentioned above. Through contacts *t*21 and *t*41 of the relays T2 and T4 in the marker MT and contact *s*144, the relay S15 in SNR1 is operated and it interrupts the holding potential of the bridge GVB1 so that it releases. The releasing of the SLVB1-bridge is effected by means of a relay R. This relay which has one contact *r*1, *r*2 etc. for each of the SLV-bridges, operates with positive potential from the make contact *t*24 of the relay T2 and interrupts by its contact *r*1 a shunt branch connected in parallel with each of the *c*-wires in said bridges. Parallel to this shunt branch the *c*-wire comprises a rectifier L which normally is short-circuited by the shunt branch but upon operation of the R-relay cannot transmit current from the occupied line terminal via the SLVB1-multiple. Consequently the SLV-bridge will be released upon operation of the R-relay when the *c*-wire through the GVB-bridge is interrupted and the revertive current path is blocked. Thus it is not necessary to keep the bridge blocked while the occupied line is in talking connection.

If the called line is occupied by a connection through the link circuit SNR1 and the calling line which calls through SNR2 has preference, the last mentioned line usually will be connected to the connection by dialling a definite number, for example two digits after having received a busy tone from the register. When this occurs, the marker is connected again in the usual manner and a new busy test is obtained but in this case the preferential line is connected to the proceeding conversation. This is well known per se. In the present device the preferential line obtains busy test in the same way as a non-preferential line, the GVB- and SLV-bridges releasing in the manner described hereabove. When the preferential subscriber obtains a busy tone from the register and he dials the particular signal, he will be connected again to the marker, in this case however, besides the S24 relay in SNR2, also the relay T4 in the marker will be operated by means of the register (*t*52, REG, T4). This will cause that the relay S25 in SNR2 will not operate and interrupt the current for the GVB-bridge and will also not operate R-relay because the relay T4 interrupts the positive potential through the make contact *t*45 of the relay T2. Consequently neither the GVB2-bridge nor the SLVB2-bridge is released as upon an ordinary busy test. In SNR2 on the other hand the relay S21 will operate through make contacts *t*22, *t*43 on *s*241 of the relays T2, T4 and S24. When the relay S24 releases upon release of the marker (M2 releases upon release of T5), the S21 relay will be held through its own contact, break contact *s*242 of the relay S4, the GVB2-selector and the short-circuiting shunt branch of the rectifier L in the SLVB2-selector from the same positive potential which holds the cut-off relay BR. Said postive potential is obtained through a contact *g*12 of the G-relay, through the link-circuit SNR1 occupied by the connection, break contact *s*115 of the relay S11, break contact *s*142 of the relay S14 and through the bridges GBV1 and SLVB1 which are occupied by the connection. By operation of the S1-relay in link circuit SNR2 the preferential subscriber will be connected through the contacts *s*212, *s*214 of the S21 relay to the *a*- and *b*-wire of the called subscriber line and he can request the latter to replace his handset. When the desired subscriber has replaced his handset, the pure positive potential of his cut-off relay ceases, S21 cannot longer hold itself with positive potential through a resistance $m22$, but releases and when the cut-off relay is released, a ringing signal is sent in due order from SNR2 and the preferential line obtains connection through SNR2 and the bridges GVB2 and SLVB2.

FIG. 4 shows an example when the setting up of an external call is carried out by means of an exchange line (FDR–C) from the operator. The setting up is effected in the same way as has been described in connection with a local call with the difference that an exchange line (FDR–C) belonging to a definite incoming line replaces the link circuit SNR. The operator connects herself to the exchange line, e.g. FDR–C1, which causes the relays F12 and F14 in the exchange line to operate. The marker points out a free link leading to the required line, for example through the GVB2- and SLVB2-bridges. The GVB2-bridge obtains holding positive potential from the break contacts $f151$ of the relay F15 in the exchange line FDR–C1. A test is carried out in the same way as upon a local call. The bridge in the SLV-stage is held from the test wire $c2$ with positive potential through a resistance $m12$. If the required line is free, the operator disconnects herself from the trunk whereby the relay F14 releases so that the SLVB2-bridge and the cut-off relay BR obtains positive potential from the break contact $g21$ of the relay G, through the break contact of $f115$ of the relay F1 and break contact $f142$ of F4. At the same time the relay F12 releases so that the incoming line is connected to the required subscriber line B through the contacts of the F12 relay.

If the subscriber line is occupied, the difference in relation to a local call consists therein that the F11 relay is operated in the exchange line in a similar manner as S21 when the call was coming from a preferential line. When the operator has connected herself to an occupied subscriber line, the relay T2 in the marker MT operates with positive potential from the test wire through the make contact of the F14 relay. The current passes through $g11$, $s15$, $s42$ in SNR, test wire $c$ through the bridges CVB1 and SLVB1, test wire $c2$ and contact $f143$. A further relay T4 in the marker always operates when the marker is connected to an exchange line, in the same way as when the call is coming from a preferential line. Through the make contacts $t22$ and $t43$ of T2 and T4 the F11 relay is operated and it receives holding potential in the same manner as has been described hereabove in connection with the S21 relay. The operator is connected to the proceeding connection through the transfer contacts of F1. The operator can release the exchange line and the operated bridges by connecting positive potential to the G-relay, the F15 relay and the R-relay through the switch K, whereby the holding of the F11 relay and the bridges ceases.

If the calling external line wants automatic waiting, the operator leaves the exchange line which by means of the relay F11 automatically supervises the proceeding conversation, i.e. the relay F11 is kept operated through the multiple, from the link circuit or the exchange line respectively participating in the proceeding conversation through the contacts $g11$, $s15$, $s42$ in link circuit SNR, the test wire $c$ through bridges GVB1 and SLVB1, test wire $c2$, contact $f142$, and contact $f117$. When the operator leaves the exchange line, the relay F12 releases but the transfer contacts of the F11 relay still separate the external line from the occupied internal line. From the make contact F118 of the relay F11 positive potential is fed to the marker, keeping the relay T4 in the marker operated. As soon as the required subscriber line terminates the conversation, the pure positive potential which has held the F11 relay will be interrupted so that the external line will be connected through contact $f121$, capacitor contact $f113$ and the already operated connecting path through the bridges GVB2 and SLVB2 to the required line L*a*, L*b*.

If the operator again connects herself to an occupied line or a preferential subscriber tries to connect himself to an existing speech connection where already an exchange line is waiting, the marker will notice whether there is any earlier supervision. When the relay T2 is operated upon a new busy test, also the relay T3 will be operated with positive potential from the make contact $t44$ of the relay T4 through make contact $t24$ of T2. Hereby the test wire is connected to a new balance-test relay T1 through the transfer contact $t32$ of the relay T3. From the make contact $t26$ of the relay T2 the relay G is operated as has been explained above. Hereby the pure positive potential is disconnected from the $c$-wires in those link circuits and exchange lines in which waiting does not go on but all the existing speech connections are retained by the resistance $m$ in the exchange lines or link circuits. In those exchange lines and link circuits in which waiting is going on, the positive potential to the waiting relays F11 and S11 ceases from the cut-off relay BR of the supervised line terminal as said relay has earlier received its potential from the break contact of the G-relay and now is held with a potential through the resistance $me$. The relay S21 and F21 in the waiting link circuit and exchange line respectively does however not release as it still receives pure positive potential through the make contact $g22$ of the relay G. This pure positive potential will be connected to the balance test relay T1 through the double contact $s16$, $s17$ or $f116$, $f117$ of relay S11 or F11 in the waiting link circuit or exchange line, through test wire $c2$, the bridges GVB2 and SLVB2, the multiple, the bridges SLVB3 and GVB3 and make contact $f243$ of F24 in the latest connected exchange line when the marker is carrying out a test on a line terminal to which previously a waiting circuit has been connected. T1 is operated and from the make contact of T1 is obtained a warning signal to the operator that waiting already is going on and furthermore an operating voltage is fed to the R-relay through contact $t15$ so that the SLVB3-bridge may release.

If different types of testing are required upon connection to a line where already a previous waiting is going on, for example in order to indicate that the call has been connected to an exchange line on which a trunk call is existing, this may be done by using a further test relay in the marker for each new function. In this case the number of G-relays must correspond to the number of test functions and positive potential may be delivered only for one type of test at the time. This implies that for each type of testing a further relay in the link circuit and the exchange line respectively, is necessary.

The connection is carried out in such a way that when testing has to be carried out the R-relay always releases and short-circuits the rectifiers. Hereby is prevented that a relay S1 or F1, connected to waiting, releases owing to the fact that the rectifier blocks the pure positive potential. In an automatic private exchange, it would not be possible to carry out the same operation by means of only three wires, thus to have a common testing-and holding wire for the bridge, but a rectifier must be provided on the $c$-wire to prevent revertive current paths. This rectifier would however prevent supervision of conversations and signalling on the $c$-wire. By short-circuiting and opening the rectifier according to our proposal and by holding the control relays in the waiting exchange line from another pure potential while the short-circuiting of the rectifier is inhibited, it is possible to carry out in the common testing cases as well supervision as signalling by means of only one wire.

If connection to a busy line is carried out from an operator and automatic waiting for only one exchange line is possible, the operator interrupts the connection. This may be carried out by means of the diagrammatically indicated contact K in the operator's equipment, which connects positive potential to the G- and R-relays and to the relay F15 in the exchange line. F15 causes by its operation release of the GVB2-bridge, the operation of the R-relay releases the SLV-bridge as has been described above, and by the operation of the G-relay all the operated waiting relays F11, F21 are held so that they do not release when the pure positive potential from the cut-off relay of the busy line ceases, while the R-relay breaks the shunt-branch of the rectifier.

We claim:

1. A circuit arrangement for an automatic private telephone exchange, including crossbar selectors, subscriber line circuit systems connected to a line terminal multiple through which each subscriber equipment is connectable to alternate selectors, at least one operator equipment, connecting relay sets for connecting a subscriber equipment, respectively, with another subscriber equipment and with said operator equipment, a marker for setting up connections through links including the connecting relay sets and at least two idle selectors in series, test wires belonging to each subscriber equipment and extending through said links for indicating by their potential condition the idle and busy conditions of a subscriber equipment, the one selector of said at least two selectors located nearest to the called subscriber equipment being held in operative condition through said test wire, and a cut-off relay in each subscriber equipment operated by the busy-indicating potential condition of the test wire for blocking the subscriber equipment against new calls, said circuit arrangement including a first direct connection in each link between said test wire and said busy-indicating potential and a second indirect connection between said test wire and said busy-indicating potential through a resistance, a rectifier in each test wire and a break contact short circuiting said rectifier to allow said busy-indicating direct connection potential through said line terminal multiple to be fed to a link through which the busy subscriber is called, and means for removing the short circuit of the rectifier in the link set up last thereby to release the selector located nearest to the busy subscriber equipment, said circuit arrangement furthermore comprising a waiting relay holding a calling link in connection with the equipment of a subscriber equipment momentarily occupied as long as it obtains direct connection potential but releases when obtaining only said indirect connection potential.

2. A circuit arrangement according to claim 1, in which said marker includes a busy test relay responsive to a busy-indicating direct connection potential on the test wire of the called subscriber equipment through the multiple and operating the waiting relay, the waiting relay having holding contacts for connecting its winding upon operation to the test wire of the link involved and through the line terminal multiple to the test wire of the busy subscriber for energizing said waiting relay as long as the called subscriber is busy.

3. A circuit arrangement according to claim 2, in which the marker includes means for causing, upon operation of said busy test relay, opening of all said short-circuiting break contacts for releasing all links in which the waiting relay is de-energized.

4. A circuit arrangement as defined in claim 2, in which the marker includes a preference relay responsive each time a call is carried out by an equipment having means to interrupt a speech circuit, said preference relay being responsive to operation of the busy test relay for closing a current path to said waiting relay for energization thereof and for allowing it to be energized from the test wire of the busy subscriber.

5. A circuit arrangement as defined in claim 2, in which the marker includes a relay connected to a contact of the busy test relay and responsive to current therethrough when an exchange line is connected to an occupied line terminal to which another exchange line is connected in waiting condition, said relay controlling means for removing the short circuit of the rectifier in the link which has been set up last, and means for signaling to the operator that waiting already proceeds.

6. A circuit arrangement as defined in claim 2, including contacts operated by said busy test relays and disconnecting said direct connection potential from the test wire in each link and connecting said potential to a holding contact of the waiting relay in order to maintain said waiting relays in operating condition while interrupting said short circuits across said rectifiers upon releasing the bridges held through the line terminal multiple.

7. A circuit arrangement according to claim 2, in which said waiting relays are provided with transfer contacts connecting a preference equipment to an occupied speech circuit by bypassing its connecting relay set and upon release restoring the connection through the connecting relay set.

References Cited by the Examiner

UNITED STATES PATENTS 2,949,506 8/60 Abbott ................ 179—22

ROBERT H. ROSE, *Primary Examiner.*

L. MILLER ANDRUS, WALTER L. LYNDE, *Examiners.*